United States Patent [19]

Pernosky

[11] 4,371,111

[45] Feb. 1, 1983

[54] HOME HEATING SYSTEM EMPLOYING WATER HEATER AS HEATING SOURCE

[76] Inventor: Richard J. Pernosky, 2001 Fairoaks, South Pasadena, Calif. 90130

[21] Appl. No.: 162,401

[22] Filed: Jun. 24, 1980

[51] Int. Cl.³ ............................................. F24D 3/00
[52] U.S. Cl. ................................. 237/8 R; 122/20 B; 126/101; 237/19; 237/55
[58] Field of Search ..................... 237/55, 8 R, 46, 19; 126/101; 122/20 B

[56] References Cited

U.S. PATENT DOCUMENTS

| | | | |
|---|---|---|---|
| 3,896,992 | 7/1975 | Borovina et al. | 237/8 R |
| 4,143,816 | 3/1979 | Shadeland | 237/8 R |
| 4,178,907 | 12/1979 | Sweat, Jr. | 237/55 |

*Primary Examiner*—Ronald C. Capossela

[57] ABSTRACT

A heating system including a hot water heater and an air duct distribution system employs a housing having a heat exchanger located within its interior in association with a blower. Water conduits lead between the heat exchanger and the hot water outlet and the cold water inlet of the water heater. Water is passed from the hot water outlet of the water heater to the heat exchanger through a water conduit and then returned to a second conduit which passes through a pump to the cold water inlet of the water heater. The pump forcibly moves the water through the above circuit. Heat is exchanged from hot water flowing through the heat exchanger to air which is passed through the heat exchanger by a blower. After being heated the air is forced into the air duct for distribution. The system can be augmented with a second heat exchanger placed in the flue of the water heater. This second heat exchanger forms a part of the conduit between the hot water outlet of this water heater and the heat exchanger and extracts waste heat from the flue of the water heater prior to flow of the hot water to the heat exchanger.

6 Claims, 1 Drawing Figure

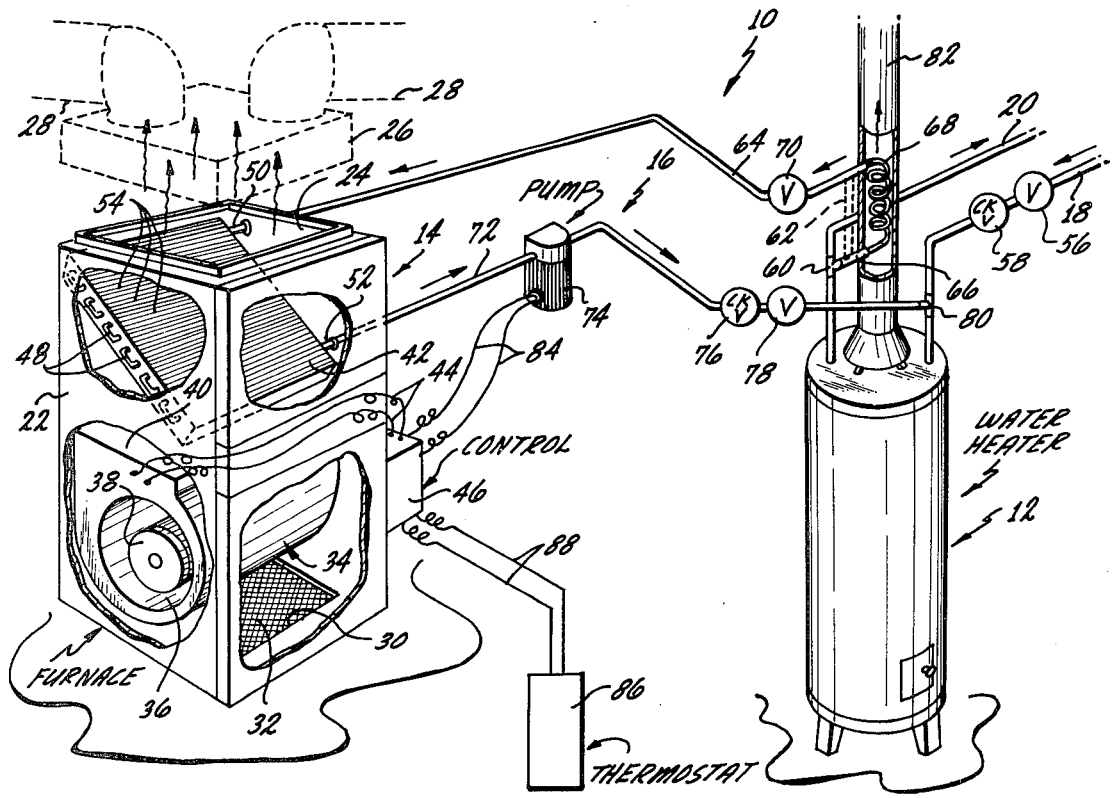

HOME HEATING SYSTEM EMPLOYING WATER HEATER AS HEATING SOURCE

BACKGROUND OF THE INVENTION

This invention is directed to a heating system which utilizes an existing hot water heater to supply heat to a heat exchanger which is used to heat air which is then forcibly delivered to supply ducts.

The typical residence expends heat energy for three things. One is to heat foods; the second is to heat water for washing, bathing, etc.; and the third is to heat the dwelling for personal comfort. Generally the heat energy for these three things is derived from either electrical energy or burning combustible fuel. In appliances which burn combustible fuel, be they stoves, furnaces or water heaters, an igniter or pilot light must be utilized. If a pilot light is used over the period of the lifetime usage of the appliance the pilot light can waste an appreciable amount of fuel. Any system which does away with the use of a pilot light therefore conserves precious fuel.

For stoves and water heaters, generally both combustible fuels and electricity are in common use as heat sources. In contrast, however, the majority of furnaces use combustible fuels. Electric furnaces are known, however. The heat transferred between electrical elements and air passed over these elements is very inefficient. Because of this electrical furnaces are not preferred. Electricity does find widespread usage though in radient type heaters and the like, but with the ever increasing costs of electrical energy, at least from an economic standpoint, it is becoming very impractical to use this type of heating. The presently preferred combustion fuel furnaces for residential heating can be further subdivided into two types. The first is based on using water as a transfer fuel and the second is based as using air as a transfer fluid. Both of these have advantages and disadvantages.

The first furnaces utilized by man were static or gravity fed air furnaces. These relied on the fact that warm air was lighter than cold air and would rise. These furnaces have many defects including drafts, overheating of interior walls the underheating of exterior walls and the like. Water was found to be a more efficient fluid compared to air for absorbing heat and distributing that heat to sources away from the furnaces. These gravity fed water systems were found to be much more efficient heating systems than the gravity fed air systems and with the introduction of metallic pipes this became the preferred form of heating. As with gravity fed air systems, the gravity fed water systems also had certain drawbacks, such as uneven distribution of heat between rooms adjacent to the furnace and those distant from the furnace.

The gravity fed water systems were improved in two ways. The first of these was by raising the water temperature sufficient such that a steam system could be utilized. Steam heating, however, also has defects, including noise, rupture of pipes, etc. The second improvement of the water system was to incorporate pumps within the system to better distribute the water to romote locations. Even with pumps, water systems have certain disadvantages. If a series loop is used to distribute the water, radiaters further downstream from the furnace get less heat than radiaters upstream, thus rendering control of temperature within individual rooms difficult. Multiple loops overcome the deficiencies of the series loop systems, however excessive amounts of pipes are needed.

The forced air system solves many of the problems of the gravity fed air system and the water problems mentioned above. The modern forced air furnace can be located either above, below or on the same level as the rooms which it will heat. Further, only a single duct need be led to each individual room. It is not necessary to have a multiplicity of return air ducts as in water systems. While water is a better absorbent of heat from a burner it has many disadvantages when it must be distributed to individual rooms. A forced air system allows for better distribution and individual control in separate rooms, but suffers the disadvantage of inefficient transfer of heat between a burner and the air being moved through a duct system. In view of this it is evident that there is room for improvement in heating systems for residences and other small buildings. Further, any system which eliminates a burner and the pilot light associated with it results in an energy savings.

BRIEF SUMMARY OF THE INVENTION

In view of the above discussion it is an object of this invention to provide a heating system which has the distribution advantages of forced air but also incorporates the use of water to absorb heat from a heat source. It is a further object of this invention to reduce the total amount of burners located in a residence and therefore eliminate the necessity of providing one of these burners with a pilot light and a supply of fuel to maintain that pilot light. It is a further object to provide a heating system which is more compact than existing heating systems and thus is advantageous to use in certain situations such as mobile homes wherein space is at a premium.

These and other objects are achieved by providing a heating system including an air distribution system and a water burner having a cold water inlet and a hot water outlet which comprises: a housing; said housing including an air inlet opening and an air outlet opening sized and shaped to mate with and form an essentially air tight connection with said air distribution system, said air inlet opening sized to allow a volume of air to draw into said housing; a heat exchanger means located within the interior of said housing and capable of receiving a stream of hot water and transferring at least a portion of the heat content of said stream of hot water to a volume of air present within the interior of said housing; said heat exchanger means including water inlet means and water outlet means, said stream of hot water entering said heat exchanger means at said water inlet means and being discharged from said heat exchanger means at said water outlet means; a blower means located within the interior of said housing and capable of moving a volume of air within the interior of said housing between said air inlet and outlet openings and contacting said moving volume of air with said heat exchanger means such that the transfer of said heat from said stream of hot water to said volume of air within the interior of said housing is effected and after said heat is transferred to said volume of air to force said volume of air through said air distribution system; a hot water conduit connected between said heat exchanger means water inlet means and said hot water outlet of said water heater and capable of conducting a stream of hot water from said water heater to said heat exchanger means; a water return conduit connected between said heat exchanger means, water outlet means and said cold water inlet of said water heater and capable of returning water discharged from said heat exchanger means to said hot water heater; a pump means operatively connected to one of said hot water conduit or said water return conduit and capable of forcefully moving water through a water pathway comprising said hot water conduit, said heat exchanger means and said water return conduit.

Preferredly the system includes a second heat exchanger means which can be located in the flue of the water heater and thus is positioned to extract additional heat from the combustion gasses of the water heater. Preferredly a control means is provided which is connected to the pump means and the blower means so as to sequentially activate first the pump means and then the blower means insuring that hot water will be located within the heat exchanger means prior to passage of air from the housing into the duct system.

BRIEF DESCRIPTION OF THE DRAWING

This invention will be better understood when taken in conjunction with the drawing which is an isometric view in partial section and includes components shown in phantom lines which do not form a part of the invention, but assist in understanding the invention.

The invention depicted in the drawings and discussed in this specification utilizes certain principles and/or concepts as are set forth and claimed in the claims appended to this specification. Those skilled in the engineering art will realize that the principles and concepts set forth and defined by the claims are capable of being utilized or expressed in a number of embodiments differing from the exact embodiment herein described and depicted. It is for this reason therefore that this invention is to be construed in light of the claims and is not to be construed as being limited to the exact embodiment shown and described.

DETAILED DESCRIPTION

The heating system 10 of the invention has three main components. The first of these is a water heater 12. The water heater 12 is connected to the second component, a blower-heat exchanger unit 14, by the third component, the conduit pump supply unit 16. The water heater 12 can be any one of a variety of standard water heaters 11 all commercially available. In the preferred embodiment which will be described, the water heater 12 will be of the type which utilizes a combustible fuel to supply heat to it. However, it is not necessary to use this type of water heater. The combustion type water heater is preferred because the preferred embodiment of the invention can extract additional heat from the combustion gasses given off from a combustion type water heater. An electrical water heater could be used but the waste heat in the combustion gases would not be available. In any event, the water heater 12 would be supplied with a cold water inlet pipe 18 and a hot water outlet pipe 20.

The blower heat exchanger unit 14 has an outer housing 22 which is shaped and sized to contain certain components. Its exact shape and size will be based on a plurality of factors. These include the location where it is placed, the duct system which it is mated with and its rated capacity for supplying heat. Determination of the shape and size is considered to be within the purview of the art skilled when those factors given above are considered with the disclosure in this specification.

The housing 22 includes an air outlet opening 24. Warm air from the blower heat exchanger unit 14 is discharged through the outlet opening 24 into a plenum 26 shown in phantom lines. Appropriate ducts collectively identified by the numeral 28 lead from the plenum 26 to individual discharge registers (not shown or numbered) located in an appropriate location throughout the structure wherein the heating system 10 is used. The air outlet opening 24 is such that an essentially airtight connection is formed between the plenum 26 and the air outlet opening 24. It is not absolutely mandatory that this seal be perfect, only that it be of a sufficient nature to insure efficiency of operation as hereinafter described.

An air inlet opening 30 is also provided in the housing 22. It can be supplemented with appropriate filters 32 and the like as is commonly utilized on existing forced air furnaces. Located adjacent to air inlet 30 and communicating with it is a blower unit 34 which includes a rotary fan 36 and an electric motor 38 appropriately coupled to the fan to rotate the fan. Spaced between the discharge opening 40 of the blower unit 34 and the air outlet opening 24 is a finned coil heat exchanger 42. The heat exchanger 42 is positioned such that air forcibly discharged from the fan 36 is caused to pass through the heat exchanger 42 extracting heat from the heat exchanger to heat up the air prior to its being discharged through the outlet opening 24 into the plenum 26. Appropriate electrical wires 44 connect the electric motor 38 to a control unit 46.

The heat exchanger 42 preferably is a coiled finned type heat exchanger having a continuous coil 48 extending from a water inlet 50 to a water outlet 52. A plurality of fins collectively identified by the numeral 54 are positioned around the coil 48 as is common in this type of heat exchanger. A plurality of passageways exist between the individual fins 54 allowing for air movement through the fins such that heat can be exchanged between the hot water moving through the coils 48 and the air passing through the fins 54. In the preferred embodiment shown in the figure the heat exchanger 42 is planar and is set at an angle within the housing 22 allowing the exposure of a greater surface area to the air moving through the housing 22. By so inclining the heat exchanger 42 at an angle a larger heat exchanger can be used, i.e. having a greater surface area, than would be possible if the heat exchanger 42 was placed at an angle parallel to the air outlet opening 24 of the housing 22. Alternately the heat exchanger 42 could be formed as two planar units intersecting at a point and located in the housing 22 such that they form a V-shape in cross section.

The cold water inlet pipe 18 as noted before leads to the water heater 12. Positioned on the cold water inlet pipe 18 is a shut off valve 56 and a check valve 58. The shut off valve 56 allows for isolation of the water heater 12 and the rest of the plumbing associated with the heating system 10 from the supply line feeding cold water to the water heater 12.

The hot water outlet pipe 20 is branched at tee 60. At tee 60 hot water can flow from the water heater 12 either through line 20 to the remainder of the other hot water faucets, etc. in the house or residence or water can flow to the heat exchanger 42 through the conduit pump supply unit 16. Two leads are shown leading from tee 60 to supply unit 16. The first of these, pipe 62 shown in phantom, feeds hot water into conduit 64 directly. The other, pipe 66, feeds a secondary heat exchanger 68, discussed in detail below. In any event hot water from water heater 12 is supplied to hot water conduit 64. Positioned in hot water conduit 64 is shut off valve 70 used in conjunction with a second valve noted below to isolate the heat exchanger 42 from the water heater 12. Conduit 64 connects to water inlet 50 on the heat exchanger 42 and supplies hot water to the water inlet 50 for passage through the heat exchanger 42.

Leading from the water outlet 52 of the heat exchanger 42 is a water return conduit 72. Interspaced within the flow of the conduit 72 is a pump 74. Also placed in the conduit 72 is a check valve 76 and a valve 78. Conduit 72 connects to cold water inlet pipe 18 at tee 80.

The pump 74 can be chosen from any one of a variety of commercially available pumps. Typically a small turbine pump propelled by a small electric motor could be used. In any event, the pump 74 forcibly moves water through conduit 64, heat exchanger 48 and conduit 72 between tee 60 on the hot water side of the water heater 12 and tee 80 on the cold water side of the water heater 12. Valve 78 is used in conjunction with valve 70 to isolate the heat exchanger 42 from the water heater 12. Check valve 76 insures that water will only flow through the heat exchanger 42 from the hot water side of the water heater to the cold water side of the water heater. Check valve 58 in the cold water inlet pipe 18 insures that warm water discharged from the heat exchanger 42 will not be fed into the cold water pipe 18.

The secondary heat exchanger 68 is placed within the flue 82 leading from the water heater 12. It is preferred to use this secondary heat exchanger 68 when the water heater 12 is of the type which utilizes combustible fuel for its heat. Inevitably with any water heater, transfer of the heat from the burners to the water is incomplete and use of the secondary heat exchanger 68 extracts additional heat from the combustion gasses discharged to the atmosphere from the water heater 12. In using the secondary heat exchanger 68 a flue 82 is used which is somewhat larger than the three inch flue normally used with common water heaters. In the preferred embodiment of this invention the flue diameter is expanded to about six inches. This allows the placement of the coiled secondary heat exchanger 68 within this flue. The presence of the secondary heat exchanger 68 within the flue does not inhibit the normal operation of the flue in discharging the waste combustion products of the water heater 12. Heat exchanger 68 could be any one of a number of designs, preferably it is a coiled copper pipe as is illustrated in the figures.

Appropriate control wires 84 lead from the pump 74 to the control unit 46. A thermostat 86 identical with existing thermostats known in the art is appropriately placed somewhere in the building where the heating system 10 would be used. It is connected to the control unit 46 by appropriate wires 88. The control unit 46 is capable of measuring a measurable event. Preferably the measurable event would be time and thus the control unit 46 would be equipped with a small mechanical or electrical timer. The function of this time will be discussed below. Alternately the control unit 46 could be provided with a temperature sensor 88 which would be placed preferably in conjunction with conduit 72 to sense the temperature of the water flowing through this conduit.

In operation valves 70 and 78 would be open allowing for flow of water from the water heater 12 through conduit 64 to heat exchanger 48 and return through conduit 72 with the assistance of pump 74 to the water heater 12. Upon sensing a drop in temperature of the room wherein the thermostat 86 is located, an electrical signal, the same as that presently used in existing furnace systems, is sent from the thermostat 86 to the control unit 46. This signal would be sensed by the control unit 46 and the pump 74 activated. This would start circulation of hot water through the water heater 12 through the heat exchanger 12. After an appropriate measurable event had occurred, such as passage of a particular period of time, the control unit 46 would activate the electric motor 38 causing the fan 36 to blow air across the heat exchanger 42 and into the plenum 26 for distribution to the building.

By delaying the activation of the electric motor 38 in respect to activation of the pump 74 the heat exchanger 42 is given sufficient time to be charged with hot water. Because of this any air delivered to the building from the heating system 10 will be hot air. If this delay was not incorporated into the heating system 10 it is conceivable that the first air delivered could be cold if, in fact, the water that was within the heat exchanger 42 had been standing for a long time and has lost all of its heat. By incorporating this feature into the control unit 46 it is insured that the heating system 10 will always deliver an initial burst of warm air.

Typically the control unit 46 would delay starting the electric motor 38, for example, from about two to about ten seconds after it turned on pump 74. The exact time delay would depend on several factors including the physical distance separating the water heater 12 and the blower pipe and heat exchanger unit 14. If these two units were quite close to one another only a small time delay would be necessary for hot water to be transferred from the hot water heater 12 to the heat exchanger 42. If the distance was quite large, then a correspondingly longer period would be needed. In order to prevent heat loss in the conduits 64 and 72 they could, of course, be insulated. This would be preferable if the units 12 and 14 were separated by any kind of distance.

As an alternate to using time as the measurable event a heat sensor, noted above, could be used in conjunction with conduit 72. This heat sensor would sense when conduit 72 contained warm water within it. At this time the electric motor 38 could be activated and it would be assured that an initial cold blast of air would not be discharged from the heating system 10.

It is considered that design of the control unit 46 is within the purview of the art skilled. Its design could be based on using appropriate and commercially available electrical-mechanical relays, timers, etc. or it could be designed around suitable microchips also commercially available. In any event the minimum function that is required from the control unit 46 is to sense a signal from the thermostat 86 and turn on pump 74 in response to that signal followed by activation of the electric motor 38 when it is assured that the heat exchanger 42 contained hot water.

As a representative example of use of the heating system 10 a blower-heat exchanger 14 was chosen which was rated at 80,000 BTU. This is a typical rating for use in an approximate 1,400 square foot residence. The unit was connected to a 30 gallon water heater 12 using ¾ inch line for conduits 64 and 72. The water temperature control on the water heater was set on the normal position, typically a position which will deliver water at 150 to 155 degrees F. When water was delivered to conduit 64 via a pipe 62 which did not flow through a secondary heat exchanger 68 an air temperature of 110 degrees F. was delivered into the plenum 26 from the unit 14. When the secondary heat exchanger 68, which consisted of ⅜ inch copper coils placed in a six inch flue, was put in line with conduit 64 and the water heater 12 was combusting its burners, an air temperature of 123 degrees F. was delivered to the plenum 26.

The above heating system 10 when initially turned on supplied heated air for approximately seven and one half minutes prior to activation of the burner of the water heater 12. This was using a thirty gallon water heater. Of course, during this time, since the burners of the water heater 12 were not activated the secondary heat exchanger 68 did not further heat the hot water flowing through the system. After the seven and one half minutes had expired the thermostat in the water heater turned on the water heater burner and in addition to the heat supplied to the water by the water heater 12 heat was supplied by the secondary heat exchanger 68.

Because of the presence of check valves 58, after hot water has flowed through the heat exchanger 42 and is returned via conduit 72 to tee 80 it goes back into the water heater. When it is returned to the water heater it still has maintained or retained the majority portion of this heat content originally derived from the burners of the water heater. Normally only about up to twenty percent of the heat is transferred. This is in direct contrast to cold water feeding through inlet pipe 18. In reheating the water which was passed through the heat exchanger 42 the hot water heater 12 does not have to supply as many calories of heat as it originally did in heating the water from a cold state. When the water heater is thus serving the function as the heat supplier for the heat exchanger 42 it does not expend as great a quantity of fuel as it does when it is supplying hot water to faucets and the like wherein that hot water is not returned. When the hot water heater 12 is supplying hot water to the heat exchanger 42 the total water system within the heating system 10 can be considered as a closed loop system. If properly insulated, the only heat lost from the system would be the heat given off from the heat exchanger 42 to the air passing through it.

Because the blower heat exchanging unit 14 does not have a burner there is no need to provide a fire wall around it, nor to provide dead air space between it and any associated walls located adjacent to it. For mobile homes this feature is very advantageous. Typically the furnace in a mobile home must be provided with dead air space around it to appropriately provide fire protection. Since space is at a premium in a mobile home this is very disadvantageous. In the heating system 10 of this invention it is only necessary to isolate the water heater 12 with regards to fire prevention. This increases the net usable space in a mobile home equipped with the heating system 10.

In addition to the above noted savings of space with use of the heating system 10 a conservation of fuel is achieved since, in effect, a burner and its associated pilot light have been eliminated. Typically with both the space and water heating systems now in use a pilot light must be provided for both of these. The heating system 10 of this invention provides for both space and water heating with the use of only one burner in any associated pilot light.

In those climates having generally moderate temperatures typically a furnace is only used at night and the water heater used mainly during the day. The water heater, however, since it is not equipped with any sort of a timing device maintains a particular volume of water at a particular temperature on a twenty-four hour basis. Even though the typical water heater is insulated heat losses will occur via conduction of heat through the hot water piping system. The net effect of this is that the burner on the hot water heater will be activated even during periods of nonusage of hot water. The heating system 10 of this invention effectively utilizes the hot water heater 12 during those periods of time when it is normally standing idle but still maintaining a reservoir of hot water at a particular temperature by alternately activating and deactivating its burner.

The heating system 10 of the invention conserves fuel by eliminating a separate furnace burner and associated pilot light, it extracts additional heat via secondary heat exchanger 68 from the waste gasses of the water heater 12, and takes advantage of the efficient transfer of heat from a burner to water. Further, it conserves space because the blower heat exchanger unit 14 does not need the space nor the fire wall insulation necessary for existing furnaces.

I claim:

1. A heating system including an air distribution system and a water heater having a cold water inlet and a hot water outlet which comprises:
   a housing;
   said housing including an air inlet opening and an air outlet opening, said air outlet opening sized and shaped to mate with and form an essentially airtight connection with said air distribution system, said air inlet opening sized to allow a volume of air to be drawn into said housing;
   a first heat exchanger means located within the interior of said housing and capable of receiving a stream of hot water and transferring at least a portion of the heat content of said stream of water to a volume of air present within the interior of said housing;
   said first heat exchanger means including water inlet means and water outlet means, said stream of hot water entering said first heat exchanger means at said water inlet means and being discharged from said first heat exchanger means at said water outlet means;
   a blower means located within the interior of said housing and capable of moving a volume of air within the interior of said housing between said air inlet and outlet openings and contacting said moving volume of air with said first heat exchanger means such that the transfer of said heat from said stream of hot water to said volume of air within the interior of said housing is affected and after said heat is transferred to said volume of air to force said volume of air through said air distribution system;
   a hot water conduit means connected between said water inlet means of said first heat exchange means and said hot water outlet of said water heater and capable of conducting a stream of hot water from said water heater to said first heat exchanger means;
   a water return conduit means connected between said water outlet means of said first heat exchange means and said cold water inlet of said water heater and capable of returning water discharged from said first heat exchanger means to said hot water heater;

a pump means operatively connected to one of said hot water conduit means or said water return conduit means and capable of forcefully moving water through a pathway comprising said hot water conduit means, said first heat exchanger means, and said water return conduit means;

said water heater being of the type wherein a fuel is combusted within a burner to heat said water in said water heater and including a flue leading from the burner of said water heater to the atmosphere;

a second heat exchanger means located so as to form a portion of said hot water conduit means and positioned within said flue and capable of extracting heat from combustion gases passing through said flue from said burner to the atmosphere and said blower means comprising a fan means and an electric motor operatively attached to said fan means and capable of activating said fan means to transfer said volume of air whereby water heated by said burner in said hot water heater first passes from said hot water heater to said second heat exchanger means for supplemental heating prior to passing through said first heat exchanger means.

2. The heating system of claim 1 including:

thermostat means operatively associated with said control means to activate said control means such that said control means activates said pump means and after a predetermined passage of time activates said blower means, said passage of time being sufficient to transfer a volume of hot water from said water heater to said first heat exchanger means.

3. The heating system of claim 2 including:

said pump means connected in said water return conduit means;

check valve means located in said water return conduit means to prevent water from flowing from said cold water inlet of said water heater to said first heat exchanger means.

4. The heating system of claim 3 wherein:

said first heat exchanger means comprises a finned coiled heat exchanger;

said blower means comprises a rotary fan, said rotary fan positioned between said air inlet opening and said finned coil heat exchanger;

said control means being capable of activating said pump means from about two to about ten seconds before said control means activates said fan;

valve means located in both said hot water conduit means and said water return conduit means.

5. The heating system of claim 4 wherein:

said finned coiled heat exchanger is planar and is located in said housing at an oblique angle to the direction of air flow in said housing.

6. The heating system of claim 1 including;

thermostat means operatively associated with said control means to activate said control means;

heat sensor means located in association with said water return conduit means, and capable of sensing the presence of hot water in said water return conduit means such that said control means activates said pump means, and after said heat sensor means senses hot water in said water return conduit means, activates said blower means.

* * * * *

UNITED STATES PATENT AND TRADEMARK OFFICE
CERTIFICATE OF CORRECTION

PATENT NO. : 4,371,111
DATED : FEBRUARY 1, 1983
INVENTOR(S) : RICHARD J. PERNOSKY

It is certified that error appears in the above-identified patent and that said Letters Patent is hereby corrected as shown below:

Column 2, line 39, "water burner" should read --water heater--.

Column 6, line 12, "heat exchanger 12" should read --heat exchanger 42--.

Signed and Sealed this

Twenty-sixth Day of April 1983

[SEAL]

Attest:

GERALD J. MOSSINGHOFF

Attesting Officer

Commissioner of Patents and Trademarks